(12) United States Patent
Wuest et al.

(10) Patent No.: US 12,271,275 B2
(45) Date of Patent: Apr. 8, 2025

(54) SYSTEMS AND METHODS OF USING GENERATIVE AI TO SIMPLIFY BACKUP SOFTWARE INTERACTIONS

(71) Applicant: Acronis International GmbH, Schaffhausen (CH)

(72) Inventors: Candid Wuest, Bassersdorf (CH); Serg Bell, Costa del Sol (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 18/344,320

(22) Filed: Jun. 29, 2023

(65) Prior Publication Data

US 2025/0004886 A1    Jan. 2, 2025

(51) Int. Cl.
*G06F 16/45* (2019.01)
*G06F 11/14* (2006.01)

(52) U.S. Cl.
CPC ...... *G06F 11/1469* (2013.01); *G06F 11/1451* (2013.01); *G06F 2201/84* (2013.01)

(58) Field of Classification Search
CPC ....... G06F 16/2425; G06F 16/23; G06F 16/31
See application file for complete search history.

(56) References Cited

U.S. PATENT DOCUMENTS

| | | | |
|---|---|---|---|
| 10,496,416 B2 | 12/2019 | Aseev et al. | |
| 11,204,842 B2 | 12/2021 | Protasov et al. | |
| 11,354,196 B2 | 6/2022 | Tormasov et al. | |
| 2018/0232381 A1 | 8/2018 | Tormasov et al. | |
| 2024/0054153 A1* | 2/2024 | Cheung | G06N 5/022 |

* cited by examiner

*Primary Examiner* — Baoquoc N To
(74) *Attorney, Agent, or Firm* — ESPE Legal Consultancy FZ-LLC

(57) ABSTRACT

Systems and methods for simplified software backup. Generative artificial intelligence (AI) based on a large language model (LLM) is utilized to determine a backup restore operation for a backup request for a target system using a metadata tracked during a previous backup of the target system, and execute the backup restore operation to satisfy the backup request.

20 Claims, 3 Drawing Sheets

SYSTEMS AND METHODS OF USING GENERATIVE AI TO SIMPLIFY BACKUP SOFTWARE INTERACTIONS

TECHNICAL FIELD

Embodiments relate generally to backup of information systems. More particularly, embodiments relate to backup of information systems using generative artificial intelligence.

BACKGROUND

An information system is an interconnected set of computing components used to collect, store, process, and transmit data and digital information. Information systems typically support a variety of business objectives.

In the case of a system or data disturbance, for example, resulting from corrupted files, files encrypted by a ransomware attack, or altered configurations, an information system or its associated data may become unusable. System users are typically forced to restore the entire system, which can take a long time and risks overwriting other benign files that have been edited since the last backup. System restores can thus result in data loss and system downtime.

Alternatively, instead of restoring the entire system, system users can restore individual files. However, restoration of individual files requires specialized user knowledge, such as the specific files and settings needed and the ability to find and select all such files and settings for the restore process in the most recent backup image. This can be time consuming and is error prone due to its high user reliance on selection of the files and settings to restore.

Certain existing backup solutions employ artificial intelligence or machine learning (ML) models to identify data for backups, determining the frequency of backup creation, and the appropriate location for storing the backed-up data. However, such systems are typically focused on the data for backup and not on ease of user interaction. More particularly, such systems still require specialized user knowledge in backup and restoration of the information system.

Therefore, there is a need for simplified backup solutions that provide optimal backups for information systems.

SUMMARY

Embodiments described or otherwise contemplated herein substantially meet the aforementioned needs of the industry. Embodiments described herein provide for simple interaction with the backup solution. More particularly, the user operating the backup solution does not need any specialized knowledge or training in order to backup and restore a target system.

In one aspect, embodiments utilize generative AI, or in one aspect, a conversational AI-trained model based on a large language model (LLM). In a feature and advantage of embodiments, the user can provide simple requests to the backup solution, such as "restore my browser," which are then executed according to the trained model. Therefore, instead of a user having to learn a specific backup solution syntax, the large language model of the generative AI finds all the required files and data automatically without the user needing to know which files or data to select, for optimal and efficient backup execution.

In an embodiment, a system for software backup of a target system comprises at least one processor and memory operably coupled to the at least one processor; and instructions that, when executed by the at least one processor, cause the processor to execute: a backup engine configured to generate a backup of the target system, a metadata tracking engine configured to track a plurality of metadata during the generation of the backup of the target system, an interface engine configured to receive a request from a user related to the backup, a machine learning modeling engine configured to: generate a trained machine learning model including by a pretrained large language model (LLM) based on data related to backup tasks, wherein the trained machine learning model is configured to: determine at least one backup restore operation for the target system using the plurality of metadata for the request, and execute the at least one backup restore operation to satisfy the request.

In an embodiment, a method of backup of a target system comprises generating a backup of the target system; tracking a plurality of metadata during the generation of the backup of the target system; receiving a request from a user related to the backup; applying a trained machine learning model trained including by a pretrained large language model (LLM) based on data related to backup tasks to: determine at least one backup restore operation for the target system using the plurality of metadata for the request, and execute the at least one backup restore operation to satisfy the request.

In an embodiment, a generative artificial intelligence (AI) model comprises an artificial neural network pretrained on a large language model (LLM) based on data related to backup tasks, wherein the generative AI model is trained to: determine at least one backup restore operation for a backup request for a target system using a plurality of metadata tracked during a previous backup of the target system, and execute the at least one backup restore operation to satisfy the backup request.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
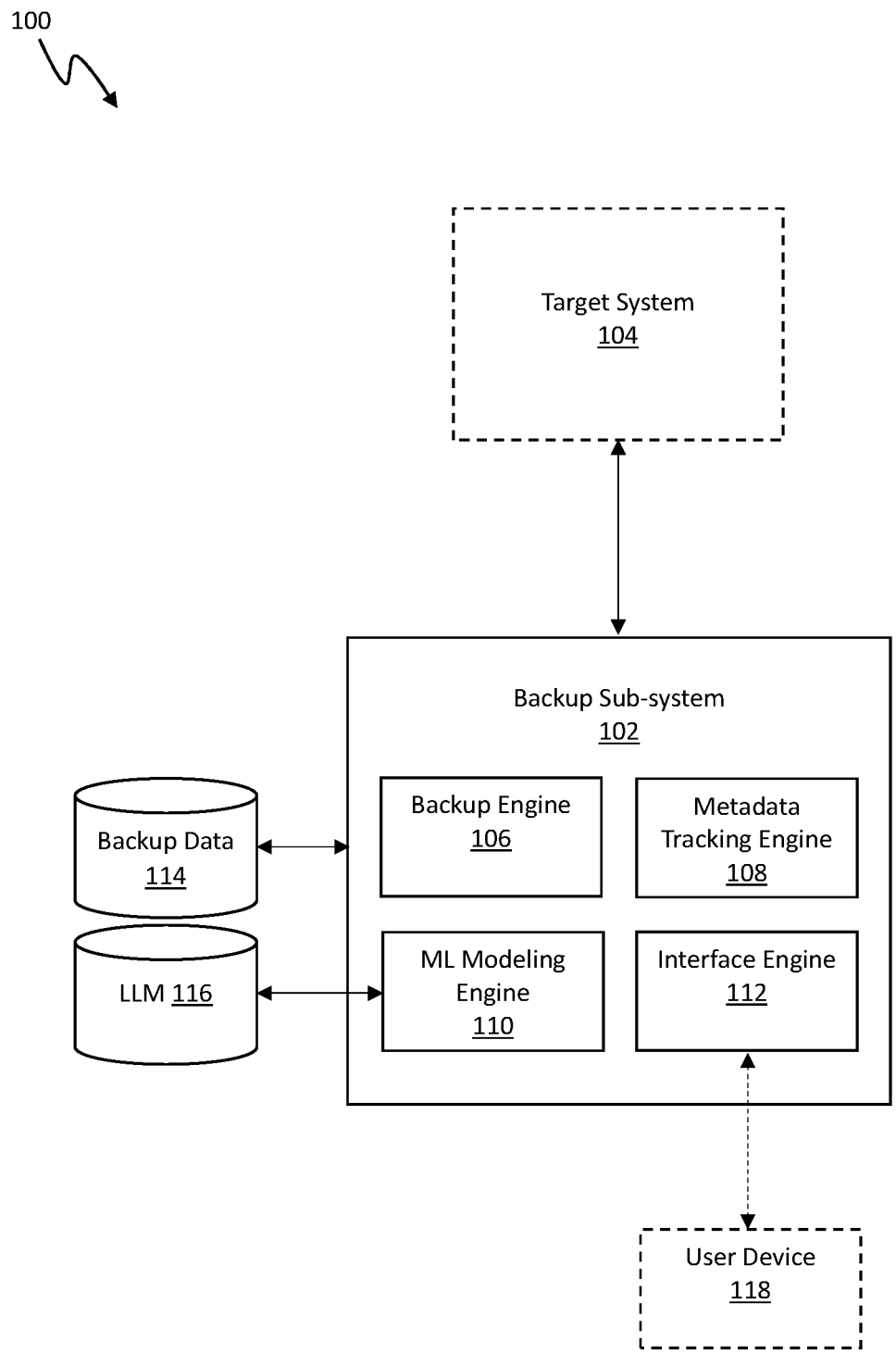
FIG. 1 is a block diagram of a system including a backup sub-system for protecting a target system, according to an embodiment.

While various embodiments are amenable to various modifications and alternative forms, specifics thereof have been shown by way of example in the drawings and will be described in detail.

DETAILED DESCRIPTION OF THE DRAWINGS

Embodiments described herein provide backup protection to one or more target systems. Referring to FIG. 1, a block diagram of a system 100 including a backup sub-system 102 for protecting a target system 104 is depicted, according to an embodiment.

System 100 includes various engines, each of which is constructed, programmed, configured, or otherwise adapted, to autonomously carry out a function or set of functions. The term engine as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In an embodiment, system 100 includes backup sub-system 102 and target system 104. For example, system 100 can be a workload computer or a server with backup sub-system 102 installed. Accordingly, in one embodiment, system 100 comprises a single computing device, including target system 104 resources that can further execute backup sub-system 102. For example, backup sub-system 102 can be installed permanently or temporarily on target system 104. In another embodiment, system 100 includes multiple computing devices such that target system 104 includes one or more computing devices and backup sub-system 102 includes one or more computing devices having access to target system 104. For example, backup sub-system 102 can be operably coupled to target system 104 over a network.

Backup sub-system 102 generally comprises a backup engine 106, a metadata tracking engine 108, a machine learning (ML) modeling engine 110, and an interface engine 112. Backup sub-system 102 further comprises a backup data repository 114 and a large language model (LLM) 116.

Backup engine 106 is configured to generate a backup of target system 104. In an embodiment, backup engine 106 can create a full backup of target system 104, according to a configuration of backup engine 106 or target system 104. For example, backup engine 106 can create a copy of all data related to target system 104, including files, folders, Software as a Service (SaaS) data, and hard drives. Effectively, all data from target system 104 is copied into a single version for subsequent remote storage (e.g. on backup data repository 114).

In an embodiment, backup engine 106 can create a partial backup of target system 104. For example, backup engine 106 can create an incremental backup of all files, folders, SaaS data, and hard drives that have changed since the previous backup activity. A previous backup activity can be the most recent full backup in the chain or the last incremental backup. In another example, backup engine 106 can create a differential backup, which falls between full backup and incremental backup. A differential backup involves generating a backup of files, folders, and hard drives that were created or changed since the last full backup (compared to just the changes since the last incremental backup).

In an embodiment, backup engine 106 is further configured to generate a log file of all files that were backed up during a backup task or backup activity. A log file can include entries for the files associated with a particular backup. For example, a log file can include a single master log file of the files backed up during a backup task (and associated data like location, timestamp, etc.). In another example, a log file can include a new log file created for each backup task such that a plurality of log files are created. Accordingly, the log file is a dynamic record of applications and files under backup. The log file can be utilized by other components of backup sub-system 102, as described herein.

Backup engine 106 is further configured to store backups on backup data repository 114. Accordingly, backup data repository 114 can include full or partial backup copies of target system 104. Backup engine 106 is further configured to store log files of backup tasks on backup data repository 114.

Backup engine 106 is further configured to restore data related to target system 104. For example, backup engine 106 can receive a backup restoration task or backup restoration operations and execute operations associated with the request. Specifically, backup engine 106 can access backup data 114 to satisfy the request on target system 104. In an embodiment, backup engine 106 can utilize the log file generated as part of a backup task to implement backup restoration tasks or backup restoration operations. For example, backup engine 106 can locate an entry in the log file and any corresponding metadata (as will be described), and restore the particular file through backup data 114.

Metadata tracking engine 108 is configured to track metadata related to the data read of target system 104. In embodiments, metadata tracking engine 108 is configured to track data prior to, during, and after a backup. For example, metadata tracked by metadata tracking engine 108 can include filenames, full file path, file size, associated tags, keywords of context or other attributes. In an embodiment, metadata tracking engine 108 therefore tracks which files exist and are available to restore. Such tracking allows for queries to system 100 related to backup activities.

Metadata tracking engine 108 is therefore operably coupled to backup engine 106. In an embodiment, backup engine 106 can report the results of the data read to metadata tracking engine 108. In another embodiment, metadata tracking engine 108 can be positioned as an event handler or event listener that waits for a backup event between backup engine 106 and target system 104. Once a backup event is determined, metadata tracking engine 108 tracks the metadata related to that backup event.

In an embodiment, metadata can include, for example, a full path name and a timestamp of the last modification, such as:

C:\User\Album\Photo1.jpg, 14:04-14-6-2023
C:\User\Album\Photo2.jpg, 14:04-14-6-2023

Additional metadata can be selected depending on file type from mime-type or by extensions such as .txt, .pdf or by keyword search in the filename. Depending on the filetype, different data is tracked and collected. For example, for a photo image, metadata can include GPS coordinates of where the photo was taken. For a PDF file, metadata can include the document description containing the title and author of the file. Accordingly, in our example, Photo1.jpg might have the GPS coordinates for Zurich. As will be described, such metadata can be utilized to allow a user to later search and executed backup tasks related to the files (e.g. to "restore all Photos from Zurich in 2023").

Metadata tracking engine 108 is further configured to store metadata related to backup activity on backup data repository 114. In an embodiment, metadata tracking engine 108 can utilize the log file generated by backup engine 106 in coordination with data stored on backup data repository 114 to organize the metadata. For example, a log file can include certain metadata (e.g. file paths) and also include reference to other metadata stored on backup data repository 114. In an embodiment, metadata tracking engine 108 can store metadata related to backup activity on backup data repository 114 using multiple data writes (e.g. for every piece of metadata tracked). In another embodiment, metadata tracking engine 108 can store metadata related to backup activity on backup data repository 114 using a batch write to backup data repository 114.

Machine learning (ML) modeling engine 110 is configured to generate a trained ML model. In an embodiment, modeling engine 110 can utilize LLM 116 to generate a trained model. For example, LLM 116 can comprise a pre-trained large language model. For example, LLM 116 can include an artificial neural network (ANN) having many parameters trained on large numbers of unlabeled text. In embodiments, training can include self-supervised learning or semi-supervised learning.

In an embodiment, LLM 116 can be trained on natural language processing. For example, LLM can be trained on user interactions related to system 100. In an embodiment, LLM 116 can be further trained on backup task activities. In an embodiment, vector embeddings can be utilized to associate user inputs and outputs to backup tasks.

Further, in an embodiment, vector embeddings can be utilized to associate backed up files to metadata. More particularly, in an embodiment, modeling engine 110 can further utilize backup task training data to generate a trained model. Accordingly, in an embodiment, modeling engine 110 is operably coupled to backup data repository 114.

Thus, modeling engine 110 can utilize semi-structured data to create new embeddings. Consider the example of metadata corresponding to the file Photo3.jpg below:

C:\User\Photo3.jpg->Photo, Zurich, 14:09 16.6.2023

Depending on what kind of AI model is being used, a file path [C:\User\], a type of file [Photo], a GPS location [Zurich], and/or a timestamp [14:09 16.6.2023] could be used as vector embeddings for training. Thus, modeling engine 110 is further configured to enrich the generative AI data model by retraining or refining based on data of target system 100, such as metadata. Modeling engine 110 is further configured to enrich the generative AI data model by including feedback from a user based on actual backup tasks for further integration as training data. Accordingly, in enriching the generative AI data model, metadata can be added as new embeddings or associated links for training.

In an embodiment, modeling engine 110 can use the generative AI data model can provide access to the stored metadata in repository 114. Allowing modeling engine 110 to use knowledge from metadata as input to answer subsequent requests from backup engine 106.

Interface engine 112 is configured to present graphical, text-based, or combinations of graphical and text-based interfaces to a user. In an embodiment, interface engine 112 can receive inputs related to one or more backup tasks of target system 104 from the user. In an embodiment, interface engine 112 can present outputs related to one or more backup tasks of target system 104 to the user.

Thus, in an embodiment, interface engine 112 can utilize display hardware and software of system 100 to present backup data interfaces to a user. In another embodiment, interface engine 112 is configured to present backup data interfaces to other computing devices, such as via user device 118. Accordingly, interface engine 112 can be optionally operably coupled to user device 118. For example, user device 118 can include a desktop computer, a laptop computer, tablet, or mobile computing device coupled to backup sub-system 102 over a network.

For example, a user can interact with interface engine 112 to query the trained generative AI model. In an embodiment, a user can provide written requests, or provide text through a speech-to-text module provided by interface engine 112. In an embodiment, interface engine 112 allows requests to be generated in any supported language. Further, as described herein, interface engine 112 can provide user-specific interfaces (e.g. learned behavior based on feedback loops and retraining the generative AI model).

In an example, interface engine 112 can be configured with pre-defined questions for which to present to a user. The pre-defined questions can be pre-programmed for system 100 according to common backup tasks. In an embodiment, pre-defined questions can comprise the most common backup task use cases. In another example, interface engine 112 can be further configured to present a range of the most common questions asked by a particular user (e.g. last 2-3 most common questions for UserA might differ from last 2-3 most common questions for UserB). Example questions presented by interface engine 112 can include: "Restore all photos from Paris newer than 2022," (e.g. user-specific based on AI model learning user behavior) "Restore my chrome browser," (e.g. pre-defined) or "Restore my office documents from yesterday" (e.g. pre-defined and/or pre-defined but updated based on user behavior).

As described above, backup components such as backup engine 106 and metadata tracking engine 108 can be executed on the same computing hardware as modeling components, such as modeling engine 110. In other embodiments, backup components and modeling components can execute on different computing hardware. In embodiments described herein where retraining or refining is described, modeling engine 110 can utilize hardware external to system 100 (not illustrated in FIG. 1) for re-training operations in order to speed up learning.

Figure 2:
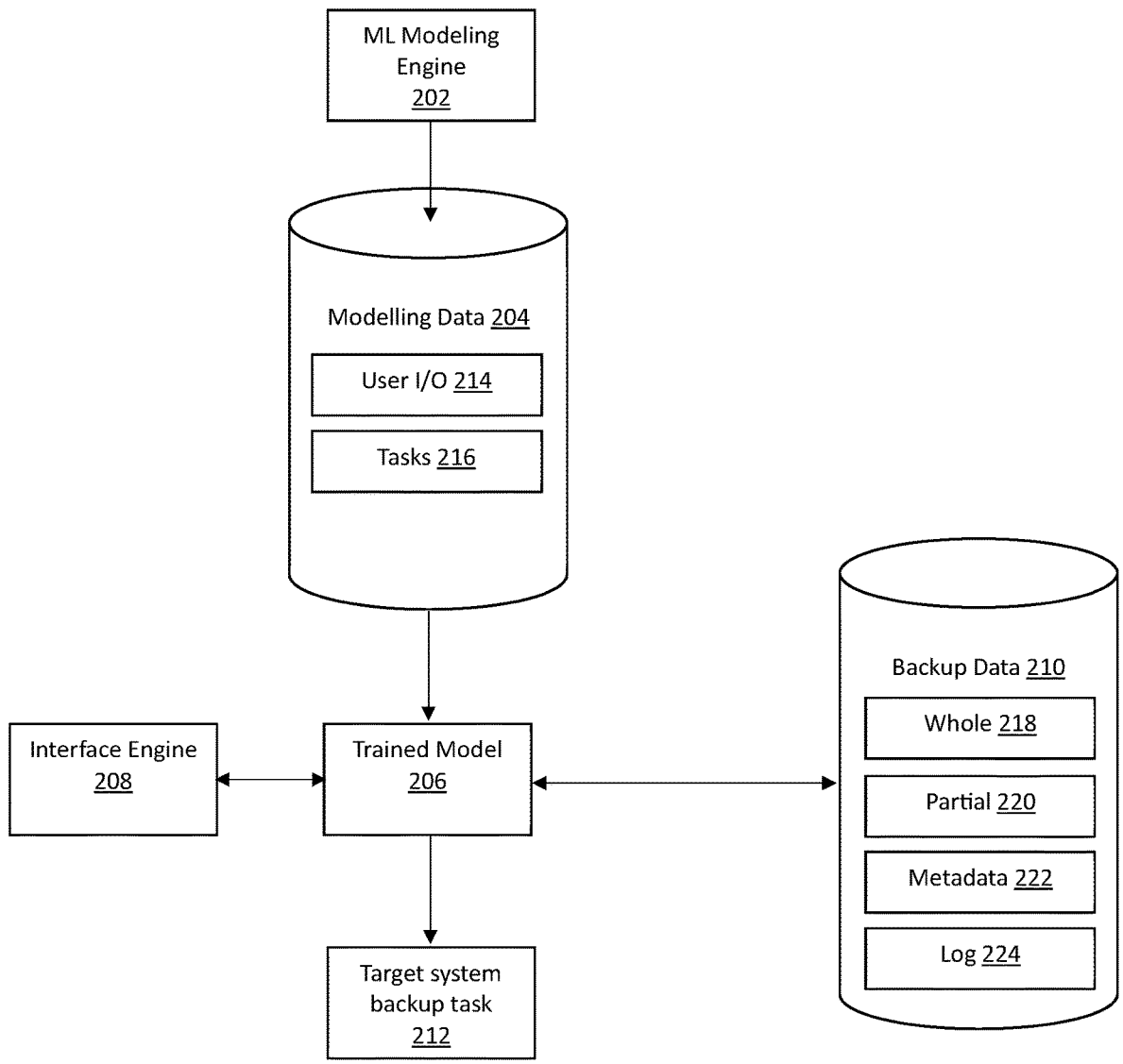
FIG. 2 is a block diagram of portions of a backup sub-system for protecting a target system, according to an embodiment.

Referring further to FIG. 2, a block diagram of portions of a backup sub-system for protecting a target system is depicted, according to an embodiment. In an embodiment, the depicted portions of backup sub-system of FIG. 2 include components of system 100 but are renumbered here for ease of discussion.

In an embodiment, portions of a backup sub-system as depicted in FIG. 2 include ML modeling engine 202, a repository of modeling data 204, a trained ML model 206, an interface engine 208, a backup data repository 210, and a target system backup task 212.

In an embodiment, modeling engine 202 is configured to generate a trained ML model using training data. Modeling engine 202 can be substantially similar to modeling engine 110 described above with respect to FIG. 1.

As depicted in FIG. 2, modeling engine 202 is operably coupled to training data or a pre-trained model, such as repository of modeling data 204. In an embodiment, repository of modeling data 204 can include a pre-trained large language model (LLM). In an embodiment, repository of modeling data 204 can include user input/output 214 data such as user interaction data (e.g. natural language), and task 216 data including backup operations.

Accordingly, in an embodiment, modeling engine 202 can access a pre-trained LLM pre-trained on backup tasks to generate trained model 206. In such embodiments, trained model 206 can be substantially similar to pre-trained LLM. In another embodiment, modeling engine 202 can utilize input/output 214 data and task 216 data to generate trained model 206. In such embodiments, trained model 206 can utilize a pre-trained LLM and further incorporate input/output 214 data and task 216 data specific to system components or system users. A feedback loop utilized by modeling engine 202 to further train and generate trained model 206 based on actual backup tasks for the system under protection thereby improves the resulting model.

More particularly, trained model 206 can be further trained on metadata of the target system. For example, trained model 206 can be operably coupled with backup data repository 210 (or portions of backup data repository 210). In an embodiment, backup data repository 210 can be substantially similar to backup data repository 114 described above with respect to FIG. 1. Backup data repository 210 can include whole backups 218, partial backups 220, metadata 222, and log files 224. As described above, trained model 206 can be further trained (e.g. after initial pre-trained modeling) based on actual backup tasks utilizing one or more of whole backups 218, partial backups 220, metadata 222, and log files 224. In embodiments, trained model 206 is further configured to access metadata 222 to satisfy restoration requests.

Trained model 206 is therefore configured to understand and process backup requests made by a user. More particularly, trained model 206 can receive a request and translate the request into one or more target system backup tasks 212. Trained model 206 is further configured to solve or otherwise execute the one or more backup tasks 212 due to its training and access to metadata 222.

In an embodiment, trained model 206 is configured to process a request by parsing or otherwise understanding the request (e.g. using user input/output modeling), and determining the required files that need to be restored. Trained model 206 can then send a restoration request to restore the required files to the backup solution (e.g. backup engine 106 in system 100). In an embodiment, one or more restoration tasks or restoration operations are output by trained model 206 and communicated to the backup solution.

For example, if the user input is "restore all photos from Zurich newer than 2022," trained model 206 uses knowledge of the embeddings, as it was trained on the metadata, to find all files that match the request. An internal output of trained model 206 would be, in an example:
C:\User\photo4.jpg, 17:04, 16.06.2023
C:\User\photo5.jpg, 17:04, 16.06.2023
C:\User\photo6.jpg, 17:05, 16.06.2023

A restoration task (e.g. target system backup task 212) is then generated by trained model 206 based on the internal output and sent to the backup system (e.g. backup engine 106 in system 100) to retrieve the corresponding files. For example, a restoration task can be:
Restore C:\User\Photo4.jpg, C:\User\photo5.jpg, C:\User\photo6.jpg In embodiments, restoration tasks can include several instructions. For example, restoration tasks can include restore, and further include timestamp metadata to restore a particular file (e.g. 17:04, 16.06.2023 for C:\User\photo4.jpg).

Interface engine 208 is configured to present graphical, text-based, or combinations of graphical and text-based interfaces to a user. In an embodiment, interface engine 208 can receive inputs related to one or more backup tasks from the user. Interface engine 208 can be substantially similar to interface engine 112 described above with respect to FIG. 1.

In an embodiment, interface engine 208 provides an interface for a user to create the request that can be processed by trained model 206, as described above. For example, a user can ask interface engine 208 to "restore my browser." Interface engine 208 model can use the stored metadata 222 to list all the browsers and present an interface asking which browser the user means. Once selected or if there is only one application to choose from, then trained model 206 can note the corresponding files and find them in backup data repository 210 and restore them. In an embodiment, interface engine 208 can present a list of the selected files to the user in a dashboard for visibility.

In another example, interface engine 208 can present an interface in which a user can ask to "restore all photos from last month." Trained model 206 can determine the restoration task by searching for photos in the backup data 210 and generating tasks to restore them.

In an embodiment, trained model 206 via interface engine 208 can also be used to ask questions about configurations of the backup solution. For example, a user can ask interface engine 208 how to create additional backups to a local connected USB disk. Trained model 206 can find a recommended solution and suggest it to the user via interface engine 208 and automatically modify the backup configuration if the user accepts the proposal. Trained model 206 can further help with general tasks such as deployment, optimization, or completeness of backups.

For example, trained model 206 can be trained on backup product knowledge based on a product description. Training data can also include product manuals and support discussions. Such training allows trained model 206 to know common deployment configurations. As a result, trained model 206 can map a current setup and infrastructure and check for deployment tips.

For example, trained model 206 can see that a backup of the specific target system is only done once per week and always to the same location. From its training (e.g. knowledge bases of product manuals and support discussions) trained model 206 knows that backups should be done daily, and that there should be at least two backup copies created in two locations. This configuration change is then presented to the user by interface engine 208.

In another example, trained model 206 is trained on product documentation, support cases and other documents relevant to the particular backup solution implemented on the target system. From this understanding, trained model 206 can answer questions like: "How can I roll out the backup agent on a virtual system in ESX environment?" The answer can be based on the learned relevant content of support documentation:

> "Deploying Backup Agent in a VMware environment involves several steps. Note: Ensure you have the necessary permissions to install the software on the target machines and that you've checked the system requirements for the Backup Agent. Here's a step-by-step guide . . . ."

In another example, if a backup job has failed, trained model 206 can help with the debugging process by suggesting a potential solution and asking further questions until the problem can be solved.

In an embodiment, through the connection of telemetry data, trained model 206 can also generate lookups or reports. For example, the user can ask interface engine 208 for a report on all failed backups in the last month in their organization. Trained model 206 can then collect all required data and generate a list or graph of the data summary.

Embodiments can implement such reporting in two operations. In a first operation, interface engine 208, can for example send a question prompt automatically the first day of the month. Interface engine 208 can be pre-programmed based on the backup subsystem or from user experience or could be custom implemented from the user.

For example, a prompt can be "Show me all folders with office documents that are backed up and sort it by most frequently used location first and show the count." Trained model 206 can determine:

C:\User\,42
C:\Documents\Office\,39
C:\Temp\fool,3

In a second operation, trained model 206 in coordination with interface engine 208 can be used to transform the data in folders \42\, \39\ and \3\ into a graphic such as a bar chart or other output, including a report document with this information.

In an embodiment, trained model 206 can be utilized to restore the full content of each backed up file. Accordingly, trained model 206 can be retrained after each backup. A user can then utilize user interface engine 208 to ask for content questions, for example, "restore all files that mention my vacation in Bahamas."

In particular, the metadata 222 gathered together with the filename, path, timestamp, size (e.g. in log 224) is expanded to include not only author, document title, but also the full text of the document. In other embodiments, content metadata 222 can include limited content such a portion of the document (e.g. the first 1024 words or other limit set, which can be predefined according to the backup solution, and can depends on performance and space availability).

In an example of content restoration, a user can have a MS WORD document including his notes about a vacation trip to the Bahamas: flight details, the hotel booked, and names of places and things to do. The MS WORD file C:\docs\SummerVacation2024.doc is backed up.

Trained model 206 can utilize, for example, the first 1024 words of SummerVacation2024.doc, and create new training embeddings, linking the document name to all the text that was extracted. Trained model 206 is then retrained based on this new training data.

Following subsequent retraining, if the user then asks to restore all files from the Bahamas vacation, trained model 206 can determine that the file C:\docs\SummerVacation2024.doc contains multiple references to Bahamas, and will then ask the backup solution (e.g. backup engine 106) to restore the file corresponding to C:\docs\SummerVacation2024.doc.

Figure 3:
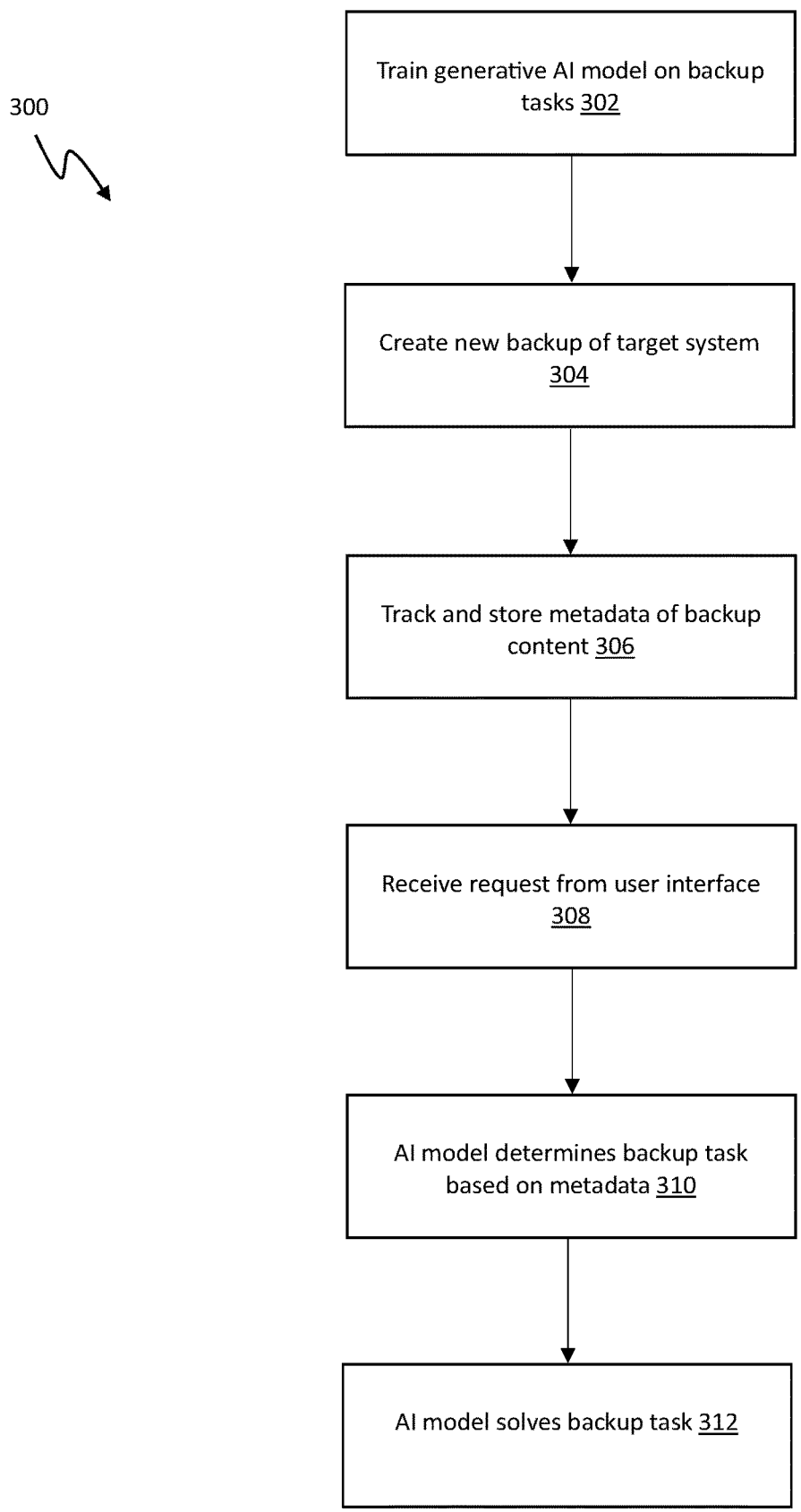
FIG. 3 is a flowchart of a method of backing up a target system, according to an embodiment.

Referring to FIG. 3, a flowchart of a method 300 of backing up a target system is depicted, according to an embodiment. In embodiments, method 300 can be implemented by system 100 illustrated in FIG. 1 and/or various backup subsystem components illustrated in FIG. 2. Reference is made further to FIG. 1 for ease of discussion.

At 302, one or more generative AI models are trained based on typical backup tasks. For example, modeling engine 110 can utilize LLM 116 to generate a trained ML model. Though training is depicted as an operation in FIG. 3, one or more generative AI models can be pre-trained in certain embodiments.

In embodiments, multiple generative AI models are utilized. For instance, a first model focused on natural language processing can be trained based on user inputs/outputs related to backup tasks. A second model can be trained based on backup task operations. The first model and second model can be utilized in a cascading ensemble. In an embodiment, the second model uses information collected from the output of the first model as additional input to the second model for operation in the cascade.

The one or more generative AI models can have access to metadata such as metadata tracked by metadata tracking engine 108 during backup operations and stored on backup data repository 114.

At 304, a backup of a target system is created. For example, backup engine 106 can create a full or partial backup of target system 104. Backup engine 104 can store the backup copy on backup data repository 114.

At 306, metadata related to backup content is tracked. For example, metadata tracking engine 108 can track metadata related to the data read of target system 104. In an embodiment, backup content including file names, file paths, and other meta content is tracked. In an embodiment, the metadata tracked is further stored in a data repository. For example, metadata tracking engine 108 can store metadata related to backup activity on backup data repository 114.

At 308, a request related to a backup task is received. For example, interface engine 112 can be utilized by a user to request backup content related to target system 104. In an embodiment, interface engine 112 can receive a request as a question in natural language. In another embodiment, interface engine 112 can receive a request via a graphical user interface. In another embodiment, interface engine 112 can receive a request via user input to a pre-programmed text-based interface.

At 310, the one or more generative AI models can be utilized to find the data that is requested to be restored or presented. For example, interface engine 112 can query the generative AI model using the request. The generative AI model (e.g. trained ML model based on LLM 116) translates the request into one or more backup tasks.

At 312, the trained ML model solves the one or more backup task. For example, the trained ML model can access backup data stored on backup data repository 114 and request the specific data of the backup task. The data can then be restored, presented, or otherwise executed according to the backup task on target system 100. In another embodiment, the trained ML model can request that backup engine 106 execute operations of the backup task. Backup engine 106 can then access backup data 114 accordingly to satisfy the request.

The invention claimed is:

1. A system for software backup of a target system, the system comprising:

at least one processor and memory operably coupled to the at least one processor; and instructions that, when executed by the at least one processor, cause the processor to execute:

a backup engine configured to generate a backup of the target system, a metadata tracking engine configured to track a plurality of metadata during the generation of the backup of the target system, the plurality of metadata associated with a plurality of vector embeddings linking files of the backup of the target system to respective metadata, an interface engine configured to receive a request from a user related to the backup, a machine learning modeling engine configured to:

generate a trained machine learning model including by a pretrained large language model (LLM) based on data related to backup tasks including a data type of at least one of the plurality of vector embeddings for the backup of the target system, wherein the trained machine learning model is configured to:

determine at least one backup restore operation for the target system for the request, the at least one backup restore operation including at least one of the plurality of metadata, and execute the at least one backup restore operation to satisfy the request.

2. The system of claim 1, wherein the backup is a full backup or an incremental backup.

3. The system of claim 1, wherein the backup engine is further configured to generate a log file of all files associated with the backup, wherein the at least one backup restore operation utilizes the log file.

4. The system of claim 1, further comprising a backup data repository, wherein the metadata tracking engine is further configured to store the metadata in the backup data repository.

5. The system of claim 1, wherein interface engine is further configured to present a natural language query interface to receive the request.

6. The system of claim 1, wherein each of the plurality of metadata is associated with a file in the backup.

7. The system of claim 1, wherein the machine learning modeling engine is further configured to access the plurality of metadata to determine the at least one backup restore operation and the request.

8. The system of claim 1, wherein the machine learning modeling engine is further configured to retrain the trained machine learning model based on a vector embedding including the at least one backup restore operation and the request.

9. The system of claim 8, wherein the vector embedding includes file content related to the at least one backup restore operation.

10. The system of claim 9, wherein the interface engine is further configured to receive a second request, and wherein the trained machine learning model is further configured to execute at least one backup restore operation to satisfy the second request using the file content.

11. A method of backup of a target system, the method comprising:

generating a backup of the target system;

tracking a plurality of metadata during the generation of the backup of the target system the plurality of metadata associated with a plurality of vector embeddings linking files of the backup of the target system to respective metadata;

receiving a request from a user related to the backup;

applying a trained machine learning model trained including by a pretrained large language model (LLM) based on data related to backup tasks including a data type of at least one of the plurality of vector embeddings for the backup of the target system to:

determine at least one backup restore operation for the target system for the request, the at least one backup restore operation including at least one of the plurality of metadata, and execute the at least one backup restore operation to satisfy the request.

12. The method of claim 11, wherein the backup is a full backup or an incremental backup.

13. The method of claim 11, further comprising:

generating a log file of all files associated with the backup, wherein the at least one backup restore operation utilizes the log file.

14. The method of claim 11, further comprising:

presenting a backup data repository; and storing the metadata in the backup data repository.

15. The method of claim 11, further comprising presenting a natural language query interface to receive the request.

16. The method of claim 11, wherein each of the plurality of metadata is associated with a file in the backup.

17. The method of claim 11, further comprising retraining the trained machine learning model based on a vector embedding including the at least one backup restore operation and the request.

18. The method of claim 17, wherein the vector embedding includes file content related to the at least one backup restore operation.

19. The method of claim 18, further comprising:

receiving a second request; and executing at least one backup restore operation to satisfy the second request using the file content.

20. A non-transitory computer-readable storage medium including instructions when executed by a processor implement:

a backup engine configured to generate a backup of a target system;

a metadata tracking engine configured to track a plurality of metadata during the generation of the backup of the target system, the plurality of metadata associated with a plurality of vector embeddings linking files of the backup of the target system to respective metadata;

an interface engine configured to receive a request from a user related to the backup;

a machine learning modeling engine configured to:

generate a trained machine learning model including by a pretrained large language model (LLM) based on data related to backup tasks including a data type of at least one of the plurality of vector embeddings for the backup of the target system, wherein the trained machine learning model is configured to:

determine at least one backup restore operation for the target system for the request, the at least one backup restore operation including at least one of the plurality of metadata, and execute the at least one backup restore operation to satisfy the request.

* * * * *